United States Patent
Iyer et al.

(10) Patent No.: US 9,324,036 B1
(45) Date of Patent: Apr. 26, 2016

(54) FRAMEWORK FOR CALCULATING GROUPED OPTIMIZATION ALGORITHMS WITHIN A DISTRIBUTED DATA STORE

(71) Applicant: EMC Corporation, Hopkinton, MA (US)

(72) Inventors: Rahul Iyer, Foster City, CA (US); Hai Qian, San Mateo, CA (US); Shengwen Yang, Beijing (CN); Caleb E. Welton, Foster City, CA (US)

(73) Assignee: EMC Corporation, Hopkinton, CA (US)

( * ) Notice: Subject to any disclaimer, the term of this patent is extended or adjusted under 35 U.S.C. 154(b) by 234 days.

(21) Appl. No.: 13/931,876

(22) Filed: Jun. 29, 2013

(51) Int. Cl.
*G06N 99/00* (2010.01)
(52) U.S. Cl.
CPC ................................. *G06N 99/005* (2013.01)
(58) Field of Classification Search
None
See application file for complete search history.

(56) References Cited

U.S. PATENT DOCUMENTS

| | | | | |
|---|---|---|---|---|
| 7,283,982 | B2 * | 10/2007 | Pednault | 706/12 |
| 8,311,967 | B1 * | 11/2012 | Lin et al. | 706/45 |
| 8,438,122 | B1 * | 5/2013 | Mann et al. | 706/12 |
| 8,595,154 | B2 * | 11/2013 | Breckenridge et al. | 706/12 |
| 8,626,791 | B1 * | 1/2014 | Lin et al. | 707/778 |
| 2003/0041042 | A1 * | 2/2003 | Cohen et al. | 706/45 |
| 2009/0030864 | A1 * | 1/2009 | Pednault et al. | 706/45 |
| 2014/0279784 | A1 * | 9/2014 | Casalaina et al. | 706/46 |

OTHER PUBLICATIONS

Akdere et al, The Case for Predictive Database Systems: Opportunities and Challenges, 2011.*

* cited by examiner

*Primary Examiner* — Stanley K Hill
*Assistant Examiner* — Mikayla Chubb
(74) *Attorney, Agent, or Firm* — Van Pelt, Yi & James LLP (57) ABSTRACT

A framework for executing iterative grouped optimization algorithms such as machine learning and other analytic algorithms directly on unsorted data within a SQL data store without first redistributing the data comprises an architecture that provides C++ abstraction layers that include the algorithms over a SQL data store, and a higher Python abstraction layer that includes grouping and iteration controllers and call functionality to the C++ layer for invocation of the algorithms.

20 Claims, 5 Drawing Sheets

FRAMEWORK FOR CALCULATING GROUPED OPTIMIZATION ALGORITHMS WITHIN A DISTRIBUTED DATA STORE

BACKGROUND

This application relates generally to analyzing data using machine learning algorithms to develop prediction models for generalization, and more particularly for applying iterative machine learning and other analytic algorithms directly on grouped data instances in databases.

Companies and other enterprises store large amounts of data, generally in large distributed data stores (databases), and the successful ones use the data to their advantage. The data are not simply facts such as sales and transactional data. Rather, the data may comprise all relevant information within the purview of a company which the company may acquire, explore, analyze and manipulate while searching for facts and insights that can lead to new business opportunities and leverage for its strategies. For instance, an airline company may have a great deal of data about ticket purchases and sometimes even about traveling customers, but this information in and of itself does not permit an understanding of customer behavior or answer questions such as their motivations behind ticket purchases, and does not afford the company the insight to make predictions that take advantage of this motivation. To accomplish this, the company may need to run various analytics and machine learning algorithms (processes) on its data to derive models which can provide insight into the data and afford generalization.

Database systems typically store data in data structures such as tables, and use query languages such as Structured Query Language (SQL) and the like for storing, manipulating, and accessing the data. Unfortunately, except for rather simplistic analytics such as max, min, average, sum, etc., SQL and other query languages cannot perform more complex analytics on data or run machine learning algorithms such as regression, classification, etc., which attempt to make predictions based upon generalizations from representations of data instances. Moreover, most machine learning algorithms require iteration on data, which SQL cannot do. This means that such analytics must be run by other programs and processes that may not operate within the database or interface well with SQL.

Moreover, since data is typically stored in a database by mixing together and storing a variety of data elements having different parameters and values, it may be necessary to redistribute the data to group common elements together for analysis. While data may be redistributed using a SQL GROUPBY operation, data redistribution is expensive and undesirable. It is time-consuming and it requires physically moving data around which has high overhead and the risk of data loss or corruption.

As a result, there are not available convenient, easy to use approaches for safely and efficiently running data analytics and machine learning algorithms on stored data within a database to derive models that characterize the data and afford insight into the factors underlying the data to permit generalization and predictions.

It is desirable to provide systems and methods that enable various analytic and machine learning processes to be applied directly to groups of data within a distributed database, without the necessity of redistribution of the data, in order to analyze the data and derive models that created the data and which can be used for generalizations and predictions. It is to these ends that the present invention is directed.

DESCRIPTION OF PREFERRED EMBODIMENTS

This invention is particularly well adapted for use with a large distributed relational database system such as a massively parallel processor (MPP) shared-nothing database system used for data warehousing or transaction processing, and will be described in that context. It will be appreciated, however, that this is illustrative of only one utility of the invention and that the invention has applicability to other types of data storage systems and methods.

Figure 1:
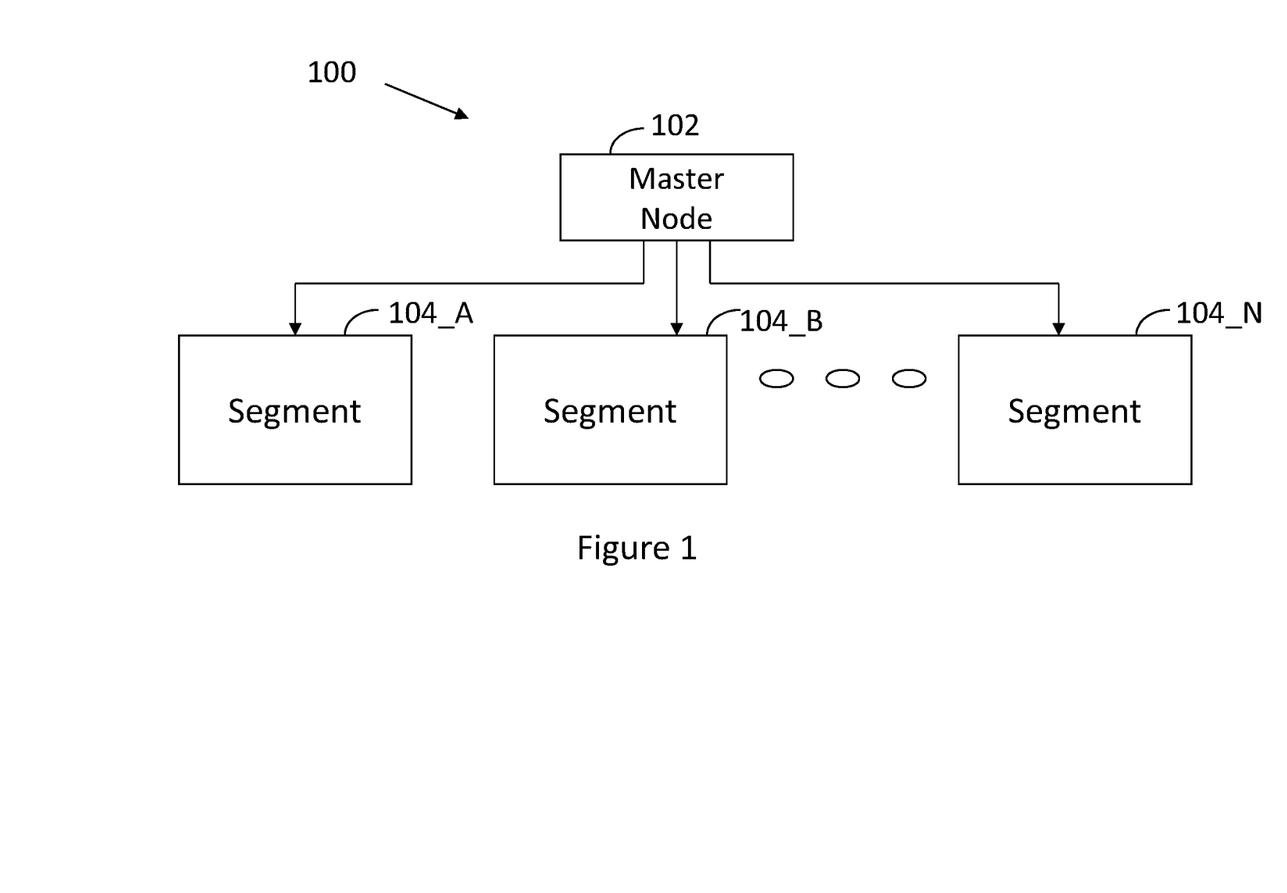
FIG. 1 is a diagrammatic view of the architecture of a distributed database system with which the invention may be used.

FIG. 1 is an overview of the architecture of one type of distributed database system 100 with which the invention may be employed, the database system shown being a massively parallel processor (MPP) shared nothing distributed database system. The database system may include a master node 102 which connects to a plurality of segment nodes 104_A through 104_N. Each segment node may comprise one or more database (DB) instances. The master and segment nodes may comprise generally similar server systems and have similar architectures and process models. The nodes operate together to process user data requests (queries) and return results, and to perform other user directed processing operations, such as running analytics and machine learning algorithms, as will be described. The segments 104_1-104_N work together under the direction of the master 102 to process workloads.

Figure 2:
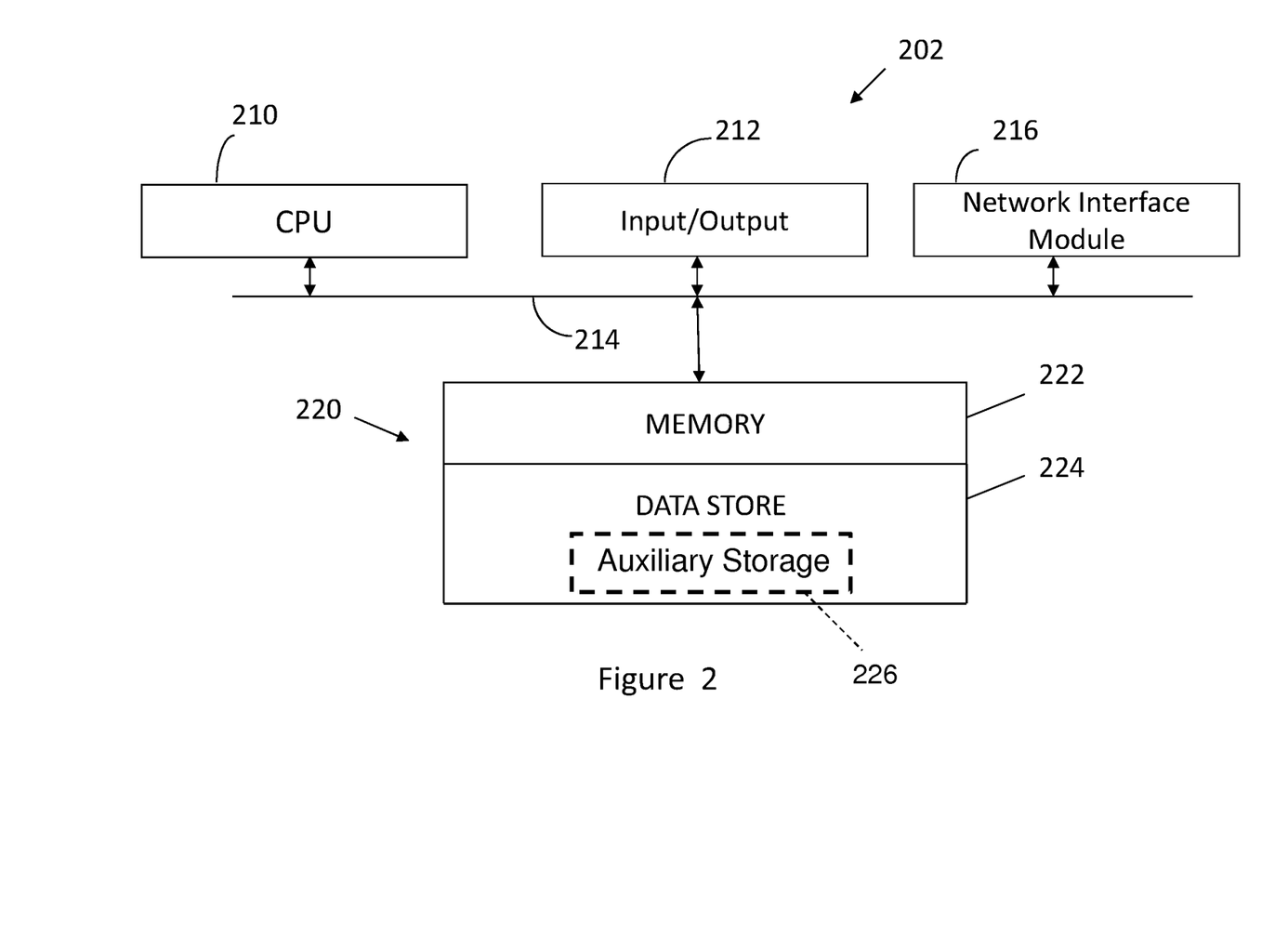
FIG. 2 illustrates a preferred embodiment of a node of the database system of FIG. 1.

FIG. 2 illustrates an example of the architecture of a master node 202 of the database system that is configured to perform processes and operations in accordance with the invention. The master node and the segment nodes may have substantially similar architectures, as stated above. The master node 202 may comprise a host computer server system (which may comprise a single CPU 210 or which may be a multi-processor system comprising a plurality of CPUs) connected to input/output (I/O) devices 212 by a communications bus 214. The I/O devices may be standard computer system input and output devices. A network interface module 216 may also be connected to bus 214 to allow the master node to operate in a networked environment. The master node may further have storage 220 comprising non-transitory physical storage media connected to the bus that embodies executable instructions, such as an operating system and application programs, to control the operations of the computer system. Storage 220 may include a main memory 222 embodying control programs that control the CPU to operate in accordance with the invention, as will be described, and may contain other storage 224 including a data store that stores system configuration information, logs, applications and utilities, data and auxiliary storage 226 for storing the results of analytic processing algorithms, for instance, as will be described.

The master 202, as will be described in more detail below, may be responsible for accepting queries from a client (user), planning queries, dispatching query plans to the segments for execution on the stored data in the distributed storage, and collecting the query results from the segments. The master may also accept directions from a user or other application programs to perform other processing operations, as will be described. In addition to interfacing the segment hosts to the master host, the network interconnect module 216 may also communicate data, instructions and results between execution processes on the master and segments.

As will be described in more detail below, the invention affords systems and methods having a unique architecture that includes a library of machine learning and statistical tools (analytic algorithms) on top of a general data store with an additional layer of abstraction above this structure. The abstraction layer may control the algorithms to operate on data in the data store and provide an iterative and grouping framework for the algorithms for merging groups of data and data sets from the data stores of different segments. This architecture enables the analytic algorithms to run iteratively and directly on selected grouped data instances in the data stores that have one or more common elements of interest, and to produce models corresponding to aggregated data values from which inferences and predictions (generalizations) can be made. By operating directly on selected data instances in the data stores, the invention avoids the necessity of data redistribution, and the iterative framework enables iterative analytic algorithms such as logistic regression and classification to be used for analyzing the data. Moreover, the architecture allows new analytic algorithms to be easily added to the library and existing algorithms to be readily changed to upgrade the functionality of the system.

In order to facilitate an understanding of the invention, consider heterogeneous table data in a database comprising thousands of data instances (rows) having a plurality of attributes (columns), and the problem of running a machine learning algorithm, e.g., regression, on similar sets of data in the data store, i.e., on selected rows based upon the similarities between specific values of attributes, in order to generate a model which can be used to make predictions using the data. This requires running the algorithm on selected rows and a combination of grouped sets of columns having specific values of interest. One approach is to redistribute the data into sets by grouping rows of data using the SQL GROUPBY operation. The GROUPBY operation enables a user to apply various aggregation operations to heterogeneous data to collect data across multiple records to group the results by one or more columns, on which machine learning algorithms may be run. However, this approach has the undesirable disadvantage of physically redistributing the data and the associated problems previously mentioned.

The following illustrates an example of an application for the invention. Consider the following portion of a publicly available data set shown in Table 1 that relates the age of abalone shellfish to different measurable physical attributes.

TABLE 1

| (Abalone Shellfish Dataset) | | | | | | | | | |
|---|---|---|---|---|---|---|---|---|---|
| Id | Gender | Length | Diameter | Height | Whole | Shucked | Viscera | Shell | Age |
| 1 | M | 0.35 | 0.265 | 0.09 | 0.2255 | 0.0995 | 0.0485 | 0.07 | 7 |
| 2 | M | 0.44 | 0.365 | 0.125 | 0.516 | 0.2155 | 0.114 | 0.155 | 10 |
| 3 | M | 0.425 | 0.3 | 0.095 | 0.3515 | 0.141 | 0.0775 | 0.12 | 8 |
| 4 | F | 0.545 | 0.425 | 0.125 | 0.768 | 0.294 | 0.1495 | 0.26 | 16 |
| 5 | F | 0.55 | 0.44 | 0.15 | 0.8945 | 0.3145 | 0.151 | 0.32 | 19 |

Users could determine the age of a particular fish by opening it up and counting rings inside the shell. However, they may wish to use the data in the Table to develop a model to predict age based upon gender and one or more of the physical attributes without having to destroy the fish. To generate models, a user may run a linear regression (or some other machine learning algorithm) on the data in the Table for all instances where "gender=M", and another where "gender=F".

Stated more generally, the problem is providing an approach for analyzing data in a database to obtain models for generalization by executing a machine learning or other analytic algorithm on table data with grouping on sets of columns to obtain as output multiple models where each model corresponds to the aggregated data belonging to a specific value of the combination of grouped columns.

Figure 3:
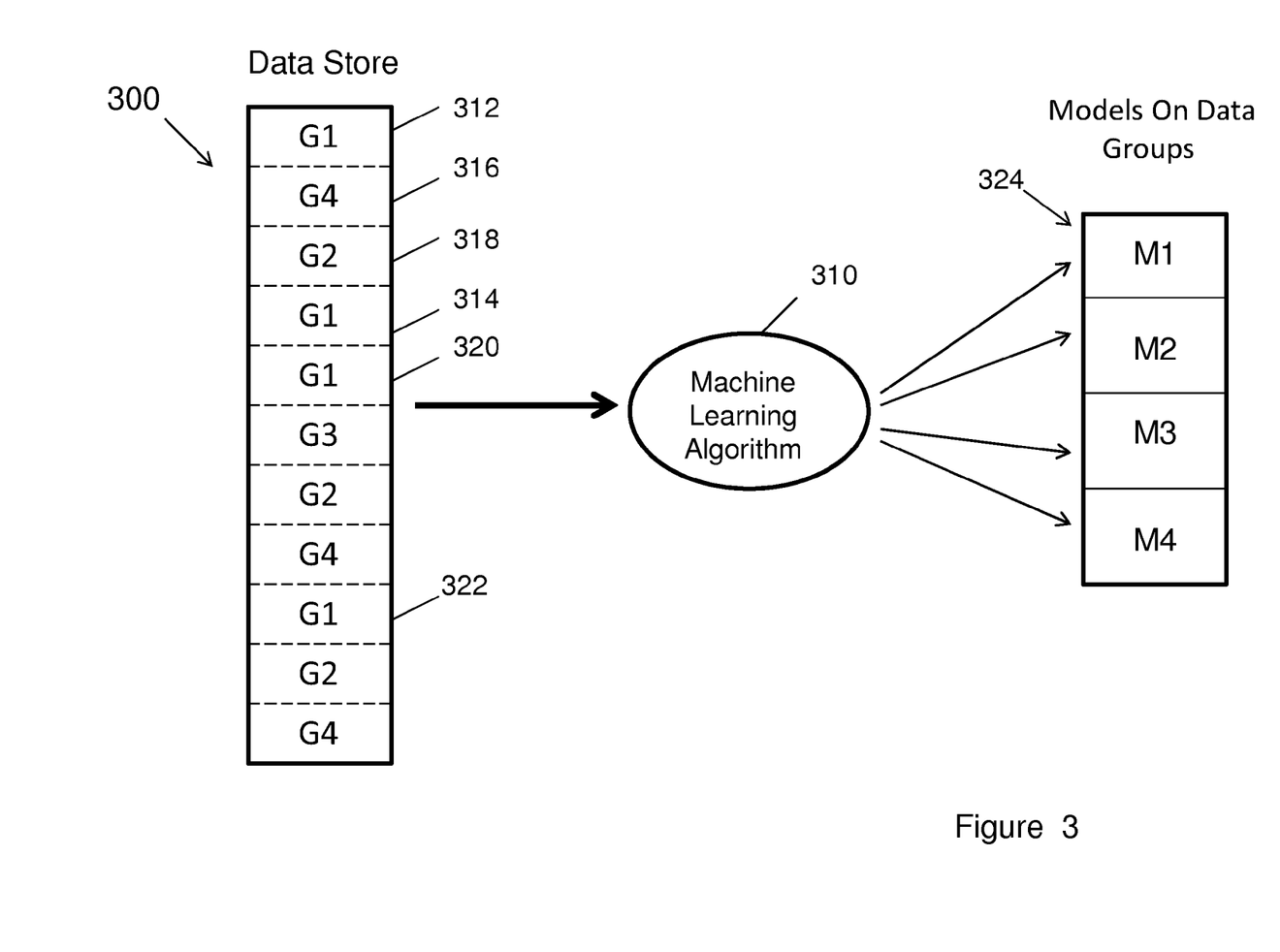
FIG. 3 is a diagrammatic view that illustrates generally a process in accordance with the invention.

FIG. 3 illustrates an approach of the invention to address the problem of developing multiple machine learning models corresponding to multiple groups in data without the necessity of redistributing the based upon grouping columns and then applying the algorithms to the redistributed grouped data as is required by known approaches. FIG. 3 shows a data store 300 that contains data instances having four different data groups G1-G4 dispersed throughout the data store. As will be described more fully, in an embodiment the invention may run a machine learning or other analytic algorithm 310, e.g., regression, for each of the four data groups, directly on the unsorted data in the data store without first redistributing the data. Four separate regression algorithms may be run in for the four groups on the unsorted data. For the first regression on the first data group G1, the algorithm selects the first instance of data group G1 in the data store at 312. Then the algorithm may jump ahead to select the next instance of G1 at 314, skipping the intermediate data instances G4 and G2 at 316 and 318, respectively, and continue onto instances of G1 at 320 and 322. The first regression on data group G1 produces a first model M1, as indicated, which may be stored in auxiliary storage 324. Similarly, regressions are also run on each of the other data groups G2, G3 and G4 in the data store to produce and store corresponding models M2, M3 and M4, respectively. This generates four machine learning models M1-M4 for data groups G1-G4, respectively. The invention avoids the necessity for explicit grouping in which a user must first distribute the data based upon grouping columns before applying the algorithm. Instead, the invention employs a novel approach of implicit grouping by using the SQL GROUPBY operation to select from the unsorted data instances each data instance containing a particular data group, and to run analytics on that particular group. This process is performed for each of the different groups and on each database segment and the resulting models are stored in auxiliary storage.

As will be described in more detail below, the invention enables iterative algorithms to be run for each group. Each iteration uses the stored models in the auxiliary storage from the previous iteration. Each iteration updates and refines the stored models and the updated models are used in a subsequent iteration to improve the solution. After a predetermined number of iterations, or when the model for a particular group no longer improves results, the models the database segments may be merged into a final model.

Figure 4:
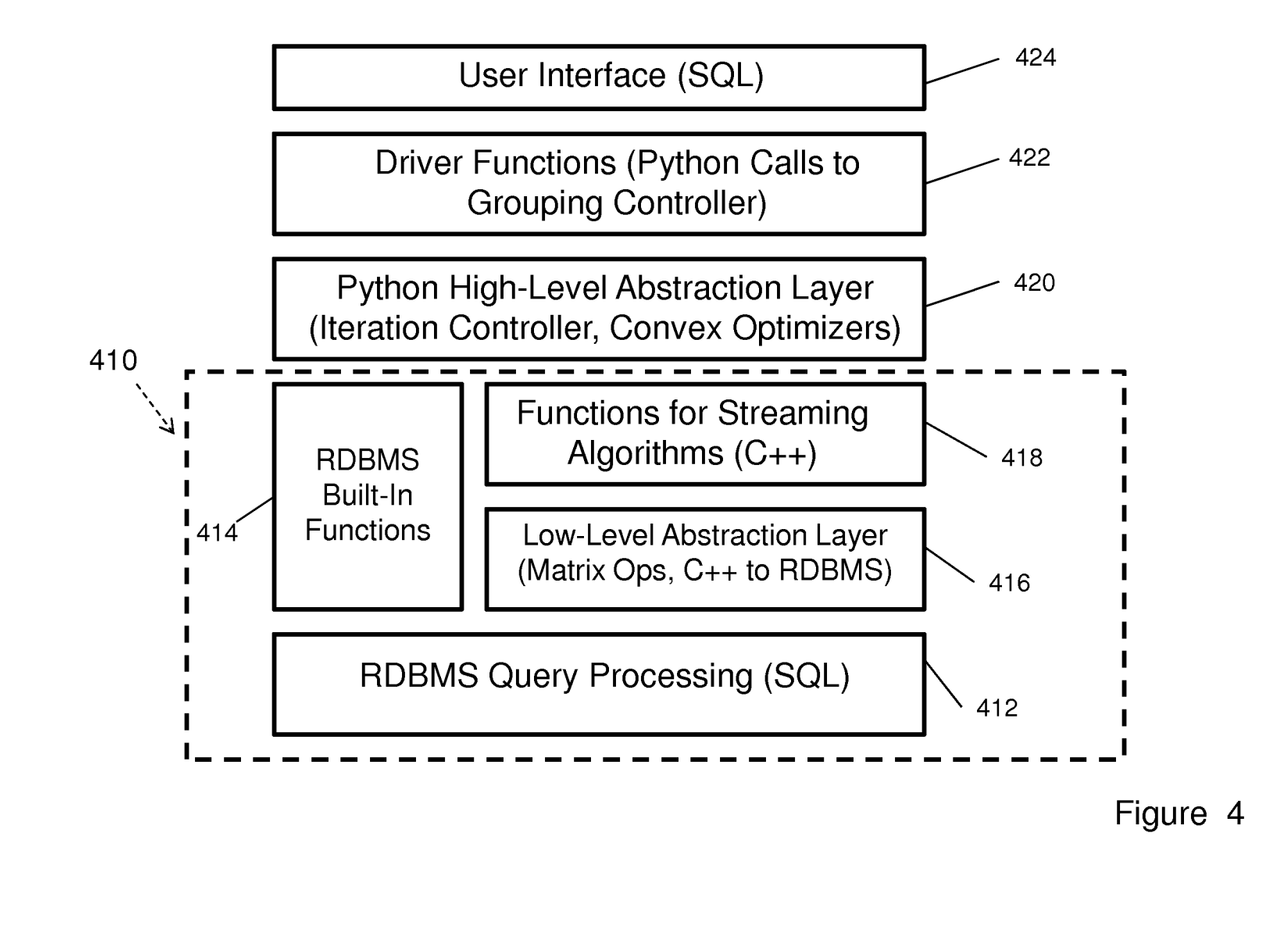
FIG. 4 is a diagrammatic view illustrating the architecture of a preferred embodiment of a system in accordance with the invention.

FIG. 4 is a diagrammatic view of the architecture of a database system that is enhanced in accordance with the invention to perform analytic and machine learning processing. As shown in figure, the database system may comprise a generally known general SQL data store 410 comprising relational database management system (RDBMS) query processing 412, for example, conventional PostgresSQL, and RDBMS built-in functions 414. The system may include on top of the conventional SQL layer 412 two or more processing layers written in a programming language such as C++. These may include a low level abstraction layer 416 that may provide matrix operations and a C++ to RDBMS bridge, and may include a function layer 418 that incorporates various machine learning and other analytic algorithms and statistical tools that may be used for analyzing the data in the database. The algorithms are preferably written in C++, which allows them to be easily updated and supplemented as needed. SQL may call the C++ functions within layers 416 and 418 to execute operations on the stored data in the database. The database system may further include a high-level abstraction layer 420 and a driver function layer 422 on top of the C++ layers. The high-level abstraction layer 420 may include a grouping controller and an iteration controller as well as other functions such as convex optimizers. The driver function layer 422 may include SQL template calls to the grouping controller in layer 420 for executing the loops of iterative algorithms (as will be described) and may include optimizer invocations. Layers 420 and 422 are preferably written in a programming language such as Python. Finally, a SQL user interface layer 424 may be included over the Python layers for controlling the operation of the database system.

Most machine learning algorithms are iterative. As described above in connection with FIG. 3 and as will be described in more detail in connection with FIG. 5, the invention saves the result models of each iteration and passes these on for use by the algorithm in a subsequent iteration. However, there is no functionality in normal SQL for performing iterations or for handling iterative processes. Accordingly, the invention provides the abstraction Python layers which are user accessible to implement iterative controllers. The Python layers perform the iterative calls and use SQL in each iteration to call the analytic functionality in the C++ layer. Additionally, they implement a grouping (aggregation) framework for temporary storage. The Python abstraction layer 420 builds an auxiliary storage in the data store, such as auxiliary storage 226 (FIG. 2), for containing multiple models, one for each value of the sets of selected grouping columns. The algorithm runs directly on the selected groups in each segment, and updates each model concurrently upon each iteration. This does not require that the data groups be distributed to parallel nodes. This allows the creation of groups on-the-fly without the need to redistribute data which saves significant time and effort.

In effect, the Python layers call the SQL and C++ layers to execute an algorithm using an initial model selected for efficiency. The algorithm updates the model during the first iteration, stores the results back into the database in auxiliary storage, and keeps track of which iteration is currently proceeding. The Python abstraction layer determines how many iterations to perform and controls the C++ and SQL layers to perform those iterations. On each subsequent iteration of the algorithm, the results of the previous iteration which are stored in auxiliary storage are used as input to the algorithm, and the results of the subsequent iterations continually update the stored models.

Figure 5:
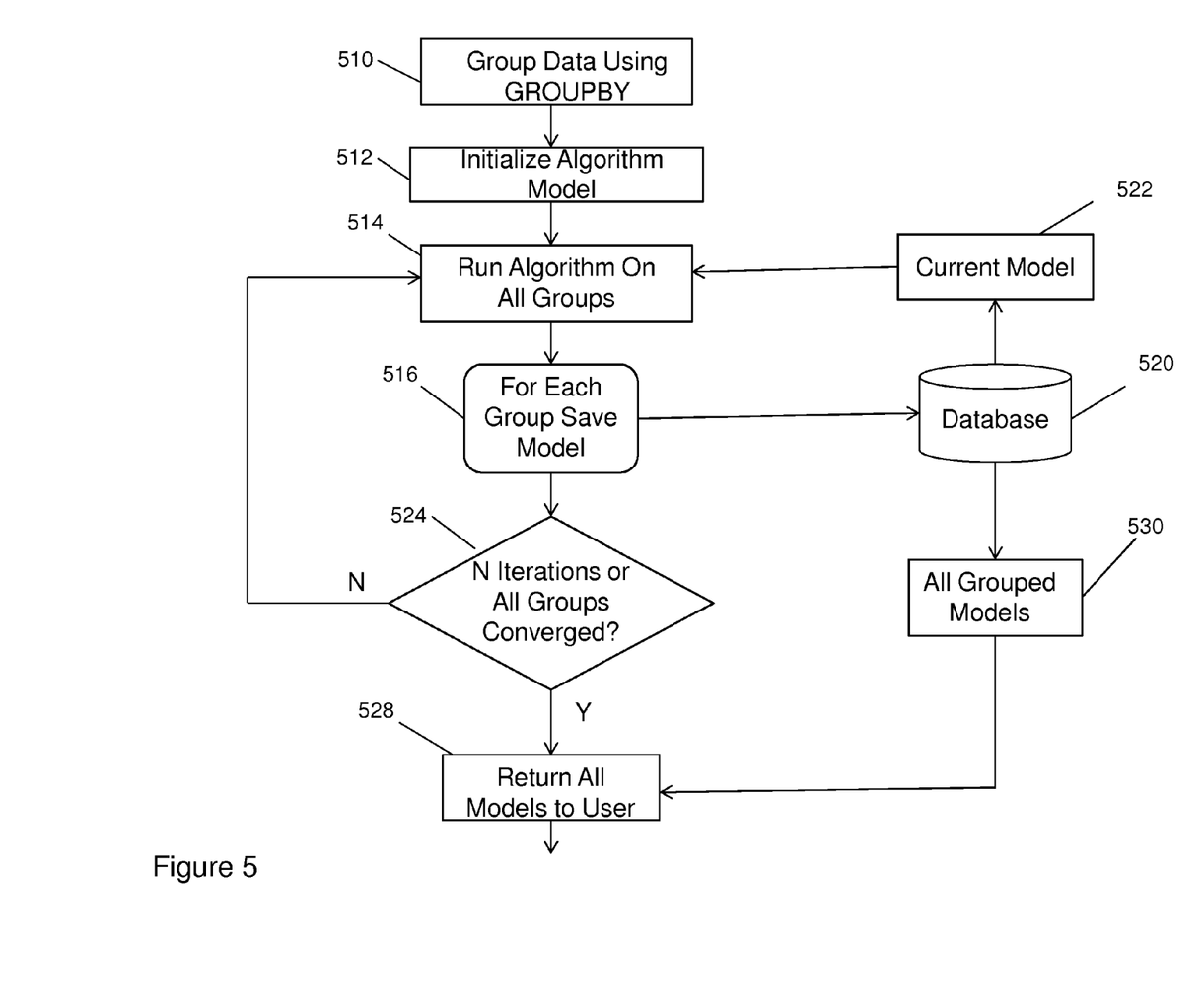
FIG. 5 is diagrammatic view of a process in accordance with a preferred embodiment of the invention.

FIG. 5 is a flowchart that illustrates an embodiment of a process in accordance with the invention. The process is run concurrently on each segment of the database. Beginning at 510, the SQL GROUPBY operation may be used to select data instances, e.g., rows within the data store of a segment to form the groups on which a machine learning or other analytic algorithm is to be run. A group may comprise data instances selected from among the various data instances in the data store that have data elements with a common characteristic or attribute value. The common characteristic may be the value of the data element of a particular column, e.g., gender, in the data instances, or it may be a combination of several columns in a data set. At 512 a starting model of the algorithm is initialized. The model may be the parameters or coefficients of the algorithm, and the initial model is preferably selected so that an initial iteration algorithm runs efficiently. At 514, an iteration of the algorithm may be run sequentially on all of the different groups of each segment, and the results of the iteration comprising a model for each group are collected at 516 and saved into auxiliary storage in a database 520. The first iteration of the algorithm is run with the initial model input at 512. Subsequent iterations of the algorithm will use an updated model corresponding to the model produced by the preceding iteration. Thus, at 522, the current model from the database that corresponds to the model for a group saved at 516 from the preceding iteration is looped back to the algorithm at 514 and another iteration of the algorithm is run on the data groups using that current model. Each iteration of the algorithm updates and refines the models to afford increasingly more accurate results. A counter may be implemented in a decision step 524 that counts the number of iterations, and the algorithm iteration loop may be repeated for a predetermined number of times (N) for each group, or until the iteration results of the groups converges, i.e., the iterations cease to improve the solution. Since the groups do not necessarily have the same number of instances, the number N of iterations will likely be different for the different groups. For example, one group may have 200 instances, another may have 2000 instances, and yet another may have 20 instances. Once the number N for a group is reached or the groups converge, the process groups the models from the database 520 at 530, and returns all of the models for the groups to a user at 528. As new data instances are added to the data store, they may be analyzed using the same algorithm and the results merged with the stored models in the database to update and refine the stored models. The stored models may be used to predict future results.

As may be appreciated from the foregoing, the invention affords a powerful and efficient approach to analyzing data sets directly in a distributed database using iterative machine learning and analytic algorithms in ways not possible with current databases.

While the foregoing has been with respect to preferred embodiments of the invention, it will be appreciated that changes to these embodiments may be made without departing from the principles and spirit of the invention, the scope of which is defined in the appended claims.

The invention claimed is:

1. A method of analyzing data within a distributed database having a plurality of database segments, comprising:

grouping, using a grouping process running within the database, instances of data into a one or more groups such that each group comprises data instances having one or more common attribute values that characterize the group, wherein the instances of data are grouped into the one or more groups without the data instances being redistributed;

running a first iteration of an analytic algorithm within the database on each of the one or more groups to generate a predictive model for each group;

running subsequent iterations of said analytic algorithm on each group using as an input model for each subsequent iteration for each group the predictive model for such group generated by a preceding iteration; and updating in said database said predictive model generated by the preceding iteration with results of said analytic algorithm generated by said subsequent iteration.

2. The method of claim 1, wherein said grouping process comprises grouping said data groups without redistributing the data instances by running a GROUPBY query language operation for each group directly on data instances of a database segment.

3. The method of claim 2, wherein said data instances comprise rows of table data in said database, and said attribute values that characterize said groups comprise one or more columns of said table data in each data instance.

4. The method of claim 1, wherein said analytic algorithm comprise an iterative machine learning algorithm that learns from said data groups to improve and update stored prediction models for each of the groups upon each iteration of the machine learning algorithm.

5. The method of claim 1, wherein said running said first iteration comprises running said analytic algorithm sequentially on each group within a database segment while concurrently running said analytic algorithm on groups of all other database segments.

6. The method of claim 1, wherein said running subsequent iterations comprises repeatedly running iterations of said algorithm for a predetermined number of iterations or until the models for each group converge, wherein each subsequent iteration runs said algorithm on said data groups using said updated predictive model from said preceding iteration.

7. The method of claim 6 further comprising, upon said iterations reaching said predetermined number or upon said converging, aggregating and returning all grouped predictive models to a user.

8. The method of claim 6 further comprising storing within the database the predictive models for each of said one or more groups from said first iteration, and updating said stored models using the results of said subsequent iterations.

9. The method of claim 1, wherein said analytic algorithm is implemented in a first application program within said database system, and said analytic algorithm is invoked and iterated by a second application program within said database system that controls said first application program.

10. A computer program product comprising a non-transitory computer readable medium storing executable instructions for controlling the operation of a computer in a distributed database having a plurality of database segments to perform a method comprising:

grouping, using a grouping process running within the database, instances of data into a one or more groups such that each group comprises data instances having one or more common attribute values that characterize the group, wherein the instances of data are grouped into the one or more groups without the data instances being redistributed;

running a first iteration of an analytic algorithm within the database on each of the one or more groups to generate a predictive model for each group;

running subsequent iterations of said analytic algorithm on each group using as an input model for each subsequent iteration for each group the predictive model for such group generated by a preceding iteration; and updating in said database said predictive model generated by the preceding iteration with results of said analytic algorithm generated by said subsequent iteration.

11. The computer program product of claim 10, wherein said grouping process comprises grouping said data groups without redistributing the data instances by running a GROUPBY query language operation for each group directly on data instances of a database segment.

12. The computer program product of claim 10, wherein said analytic algorithm comprise an iterative machine learning algorithm that learns from said data groups to improve the prediction models associated with each of the groups upon each iteration of the machine learning algorithm.

13. The computer program product of claim 10, wherein said running said first iteration comprises running said analytic algorithm sequentially on each group within a database segment while concurrently running said analytic algorithm on groups of all other database segments.

14. The computer program product of claim 10, wherein said running subsequent iterations comprises repeatedly running iterations of said algorithm for a predetermined number of iterations or until the models for each group converge, wherein each iteration runs said algorithm on said data groups using said updated predictive model from said preceding iteration.

15. The computer program product of claim 14, further comprising, upon said iterations reaching said predetermined number or upon said converging, aggregating and returning all grouped predictive models to a user.

16. The computer program product of claim 14, further comprising storing within the database the predictive models for each of said one or more groups from said first iteration, and updating said stored models using the results of said subsequent iterations.

17. The computer program product of claim 10, wherein said analytic algorithm comprises first application program instructions running on said computer in said database system, and said analytic algorithm is invoked and iterated by second application program layer instructions running on said computer in said database system, the second application program controlling said first application program.

18. A computer system for a distributed database having a plurality of database segments, comprising:

at least one processor configured to generate an aggregated prediction model based on data stored in the distributed database by executing one or more instructions provided in a database management system, a first abstraction layer, and a second abstraction layer, wherein the database management system embodies first executable instructions for controlling the operation of the computer system to group data instances in the database into one or more groups without redistributing the data instances, the groups having one or more common attribute values that characterize the groups;

the first abstraction layer arranged over said database management system, the first abstraction layer embodying second executable instructions providing an analytic algorithm and for controlling the database management system to run said algorithm sequentially directly on data instances of each of said groups of a segment; and the second abstraction layer arranged over said first abstraction layer, the second abstraction layer embodying third executable instructions providing an iteration controller that controls said first abstraction layer to run iteratively said analytic algorithm directly on the data instances in each of said groups using a predictive model for each iteration of the algorithm on a group that results from a prior iteration of the algorithm on said group, the iteration controller stopping said iterative analysis after a predetermined number of iterations or upon the prediction models for the groups converging, and upon said stopping said second abstraction layer aggregating all of said predictive models for said groups from said plurality of segments and providing the aggregated prediction models to a user, and a memory coupled to the at least one processor and configured to provide the at least one processor with instructions.

19. The computer system of claim 17, wherein said data instances comprise rows of table data in said database, and said attribute values that characterize said groups comprise one or more columns of said table data in each data instance.

20. The computer system of claim 17, wherein said analytical algorithm is one of a plurality of iterative machine learning algorithms in said first abstraction layer, and said second executable instructions interface with said first executable instructions to execute said analytic algorithm on said data instances.

* * * * *